Oct. 30, 1962     W. C. KENT     3,060,845
ADJUSTABLE EMBOSSING PUNCH AND DIE
Filed May 26, 1960     3 Sheets-Sheet 1
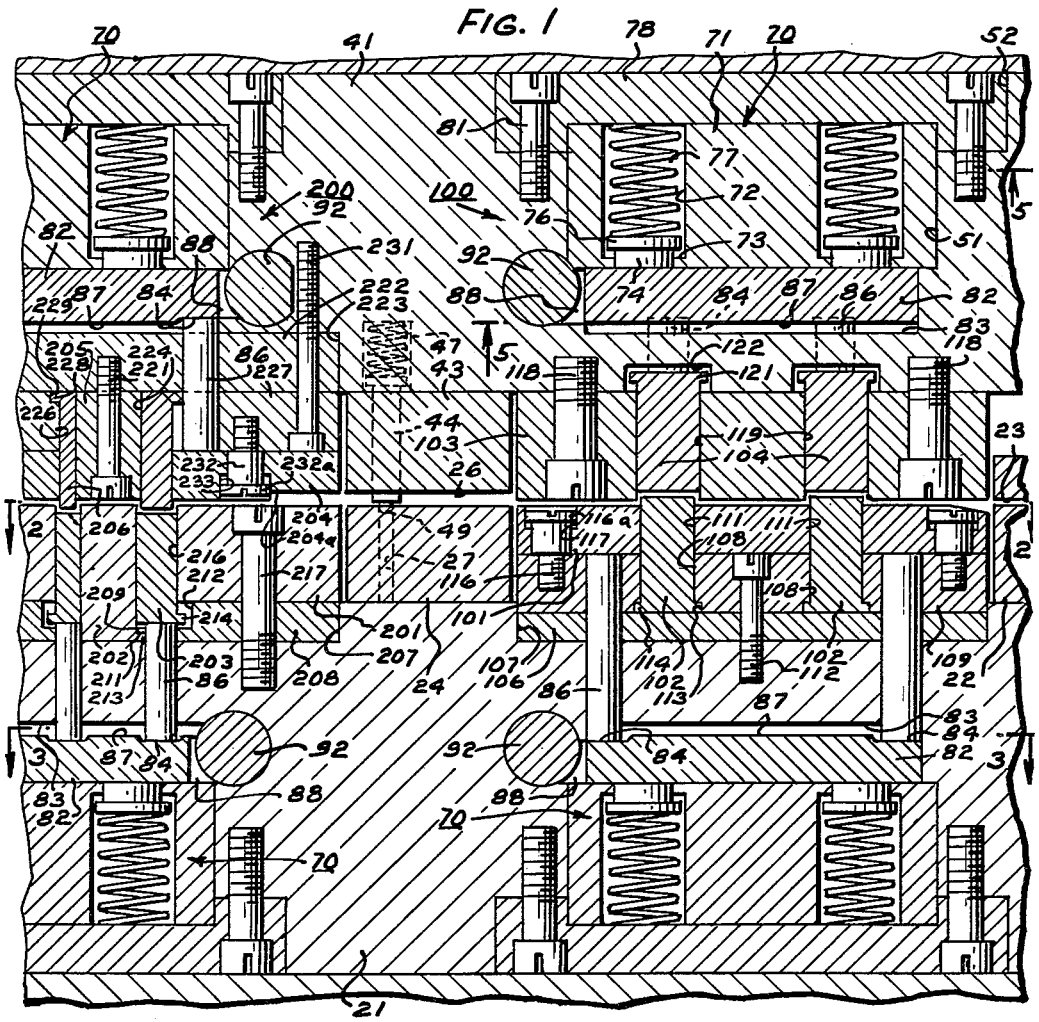
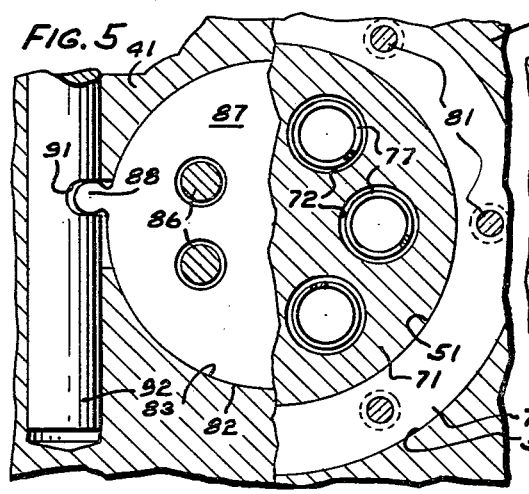
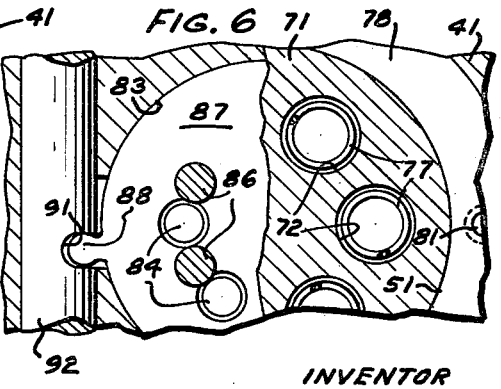
INVENTOR
W. C. KENT
BY Robert C. Geary
ATTORNEY Oct. 30, 1962 W. C. KENT 3,060,845
ADJUSTABLE EMBOSSING PUNCH AND DIE
Filed May 26, 1960 3 Sheets-Sheet 2

INVENTOR
W. C. KENT
BY Robert K Clamp
ATTORNEY

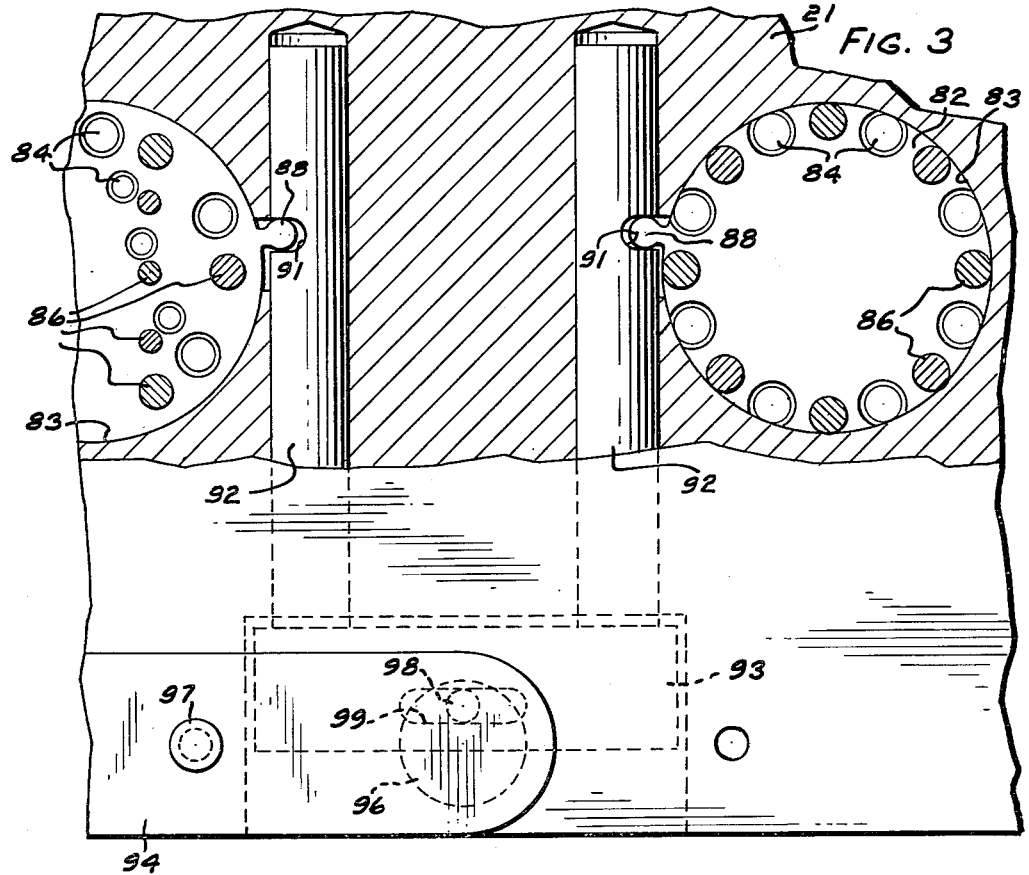
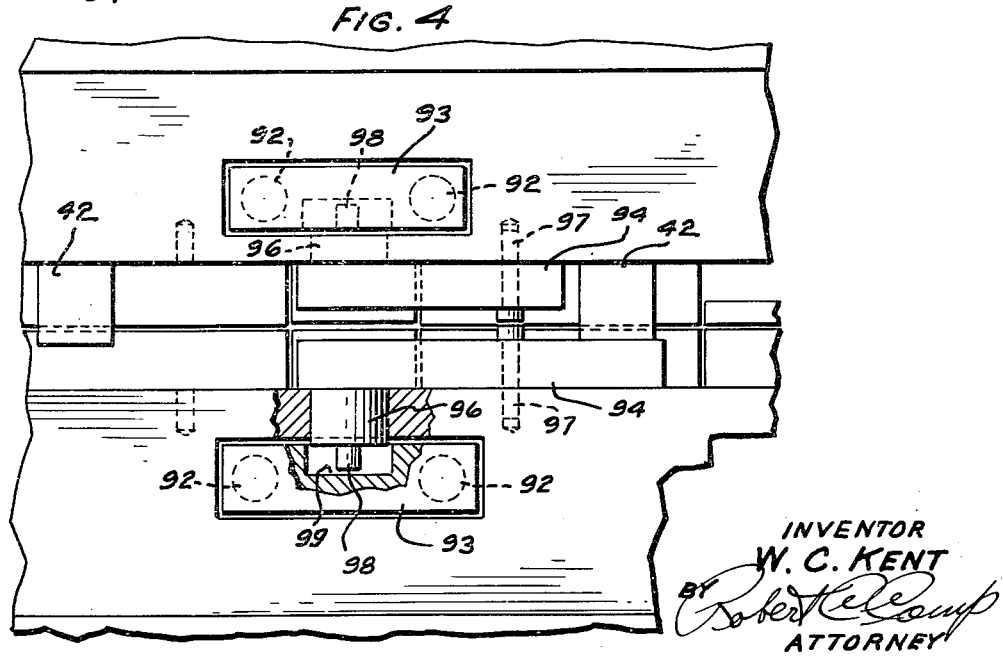

United States Patent Office 3,060,845
Patented Oct. 30, 1962

3,060,845
ADJUSTABLE EMBOSSING PUNCH AND DIE
William C. Kent, Gahanna, Ohio, assignor to Western Electric Company, Incorporated, New York, N.Y., a corporation of New York
Filed May 26, 1960, Ser. No. 31,951
16 Claims. (Cl. 101—28)

This invention relates to new and improved apparatus for embossing work parts to a variable preselected depth, and more particularly to an embossing punch and die assembly including adjacent embossing surfaces designed to engage a work part on the same side thereof wherein mechanism is provided for selectively varying the operating positions of the adjacent embossing surfaces relative to one another.

It is standard practice in the manufacture of certain piece parts to perform operations on a blank as it is fed through a punch and die set. In many instances an embossing punch and die assembly is employed wherein bosses of predetermined height are formed in a blank, as for example, in the manufacturing of spacers. In the past, when it was desired that the embossing of a finished spacer be to a different depth than the embossing of another spacer, it was necessary to remove the punch and die set from the punch press apparatus, replace the embossing punch and die with a second embossing punch and die, and then mount the punch and die set back in the punch press apparatus. This procedure was undesirable, not only because the punch press apparatus had to be held out of production while the punch and die was being changed, but further because the weight of the punch and die sets makes them difficult to handle.

An object of this invention is to provide new and improved apparatus for embossing work parts to a variable preselected depth.

Another object of this invention is to provide new and improved embossing apparatus wherein the depth of emboss may be varied without removing the embossing members from the apparatus.

A further object of this invention is to provide new and improved apparatus including fixed and spring-biased movable embossing members having adjacent cooperating embossing surfaces designed to engage a work part on the same side thereof, wherein the effective operating position of the adjacent embossing surfaces may be selectively varied relative to one another to vary the depth of emboss.

Another object of this invention is to provide in an embossing device a new and improved mechanism for varying the operating position of a first embossing surface relative to a second embossing surface adjacent thereto.

A still further object of this invention is to provide in a punch and die apparatus including a plurality of separate embossing punch and die units each including sets of embossing members having adjacent cooperating embossing surfaces for forming a plurality of bosses in work parts, a new and improved mechanism for quickly varying the operating positions of the adjacent embossing surfaces relative to one another the same preselected amount thereby to vary the depth of emboss.

With these and other objects in view, the present invention contemplates punch and die apparatus wherein two adjacent embossing units are mounted in a pair of opposed supports movable into juxtaposition with one another, each embossing unit including fixed embossing members in each support and movable embossing members in each support opposite the fixed embossing members in the other support. The movable embossing members are preferably spring-biased to facilitate the stripping of work parts from the several embossing members after an embossing operation. The fixed and spring-biased movable embossing members of each unit are mounted in the same base member and have adjacent cooperating embossing surfaces designed to engage work parts on the same side thereof. Rotatable backing plates in the form of axial cams are mounted in each of the base members between the spring-biased movable members and their associated springs for limited movement with the movable embossing members against the action of the springs. Means are provided in each of the base members for rotating the rotatable axial cams to vary the operating position of the embossing surfaces of the spring-biased movable embossing members in the associated base member relative to the operating position of the adjacent embossing surfaces of the fixed embossing members, so as to vary the depth of emboss of the work parts when the base members are brought into juxtaposition.

Other objects, advantages and novel aspects of the invention will become apparent upon consideration of the following detailed description in combination with the accompanying drawings wherein:

FIG. 1 is a partial elevational view in cross-section of embossing punch and die apparatus constructed in accordance with the present invention, taken along a line through the center of the embossing units and showing the parts of the apparatus in closed embossing position;

FIG. 3 is a plan view taken in part along the line 3—3 of FIG. 1 and showing certain of the parts seen in FIG. 2 in different operating positions;

FIG. 4 is a partial front view of the punch and die apparatus shown in FIG. 1 with the parts of the apparatus in one operating position;

FIG. 5 is a partial cross-sectional view taken along a line as shown by the arrows 5—5 in FIG. 1;

FIG. 6 is a partial cross-sectional view similar to FIG. 5 but showing certain of the parts in FIG. 5 in a different operating position;

Figure 2:
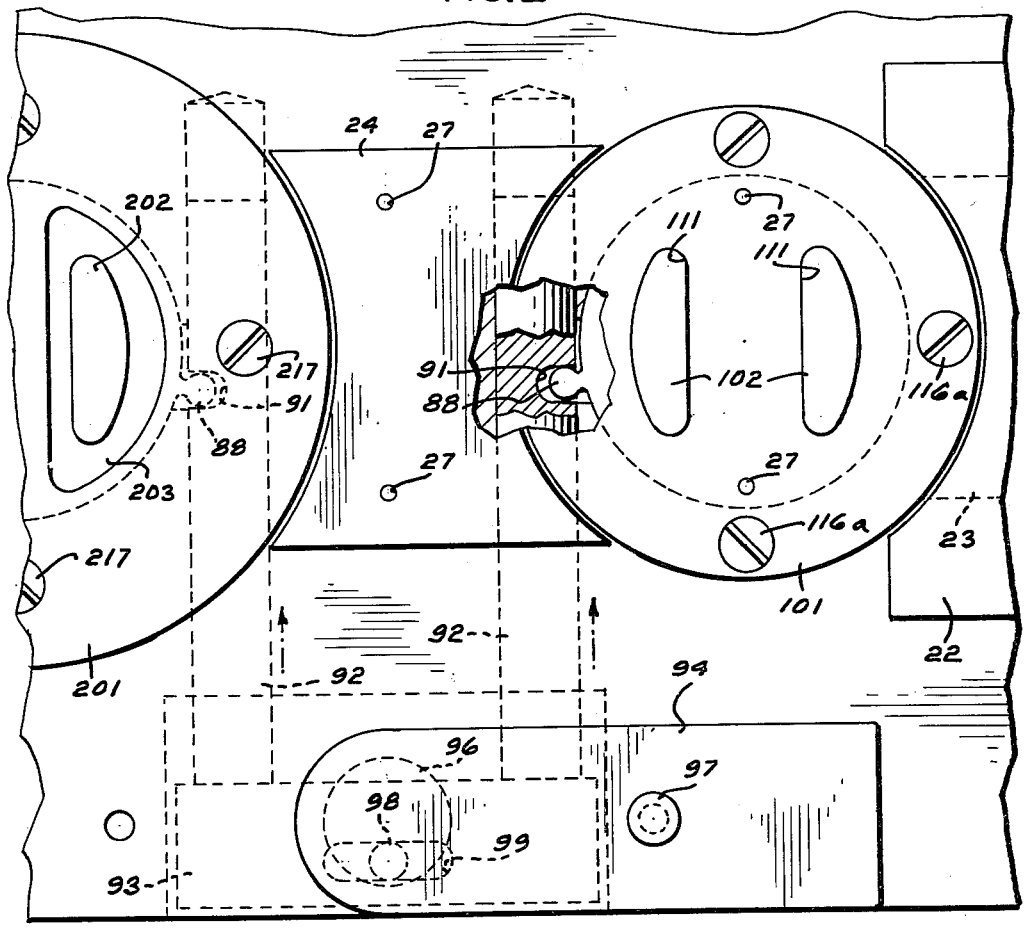
FIG. 2 is a plan view of the lower die assembly, partially in cross-section, looking in the direction of the arrows 2—2 in FIG. 1.
Figure 7:
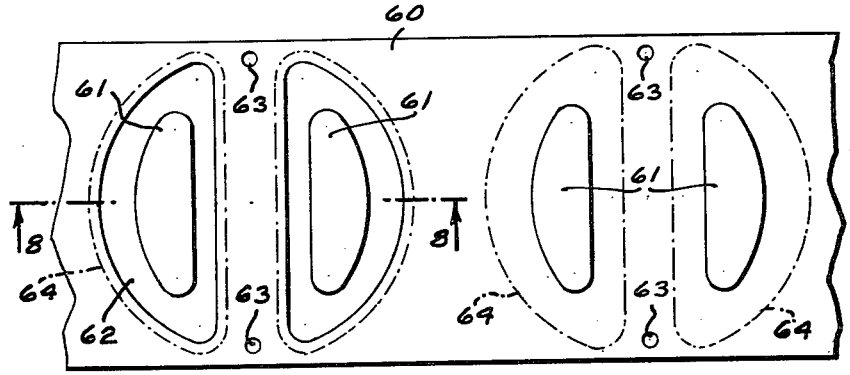
FIG. 7 is a partial plan view of a blank in the form of a strip showing the outline of the bosses formed therein by the punch and die apparatus shown in FIGS. 1–6.
Figure 8:
Figure 9:
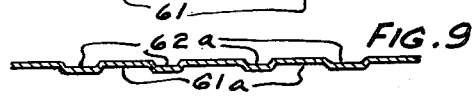

FIG. 8 is a cross-sectional view taken along the line 8—8 in FIG. 7 showing the depth of the bosses formed in the blank with the apparatus positioned as shown in FIGS. 1, 2 and 5; and FIG. 9 is a cross-sectional view similar to FIG. 8 but showing how the depth of the bosses in the blank may be varied by positioning the apparatus as shown in FIGS. 3 and 6.

GENERAL CONSTRUCTION

Referring to FIGS. 1 and 4, the embossing punch and die apparatus includes a lower assembly and an upper assembly, which are substantially identical, the lower assembly being known in the art as the "die" and the upper assembly being known as the "punch." The lower die assembly includes a base or support 21 and the upper punch assembly includes a base or support 41 mounted on the base 21 in a conventional manner (not shown) for vertical relative movement, as for example, by guide posts and bushings secured to the base 21 and base 41, whereby the upper punch assembly may be moved into juxtaposition and away from the lower die assembly by conventional drive means (not shown), as for example a hydraulic ram.

The downward movement of the upper punch assembly toward the lower die assembly is limited by means of stop blocks 42 (FIG. 4) secured to the upper punch assembly in a conventional manner (not shown), as for example, by screws or welding. As shown in FIG. 4 the left hand stop block 42 has a greater height than the right hand stop block, the shorter right hand stop block limiting the downward movement of the upper punch assembly by abutment with a rotatably mounted lever 94 (described in greater detail hereinbelow) when the parts of the punch and die apparatus are in a position to form a relatively greater depth of emboss as shown in FIG. 8. Similarly, the taller left hand stop block limits the downward movement of the upper punch assembly by abutment with the rotatable lever 94 when the lever has been rotated 180° to a different operating position under the taller stop block and the parts of the apparatus are in a position to form a relatively smaller depth of emboss as shown in FIG. 9.

Embossing punch and die units 100 and 200 (only one-half of unit 200 being shown) are mounted in the lower die assembly and the upper punch assembly for performing successive embossing operations on a blank or work part 60 (FIG. 7) in the form of a strip, as it is fed between the upper punch assembly and the lower die assembly.

As shown in FIGS. 1 and 2, a guide member 22 for guiding the work strip 60, including a feed slot 23 in alignment with the embossing units 100, 200, is secured to the lower die assembly base 21 by screws (not shown) or other conventional means. Similarly, between the embossing units 100 and 200, a lower member 24 is secured to the lower die assembly base 21 and an upper member 43 is secured to the upper punch assembly base 41 so as to be spaced apart and form part of a slot 26 when the punch and die assemblies are in an embossing position.

Work part aligning pins 44 (FIG. 1), positioned halfway between the centerlines of the embossing units 100 and 200, are slidably disposed in apertures in the upper member 43 and are biased downwardly by springs 47, as shown, whereby a projection 49 on the lower end of each pin engages in an aperture 27 formed in the lower member 24 when the bases 21 and 41 are in closed embossing position. Similar aligning pins (not shown) are mounted in each of the embossing units 100 and 200 on the transverse centerline thereof, whereby the several aligning pins properly position the work strip 60 in the embossing units 100 and 200 during an embossing operation in a manner to be subsequently described.

*Embossing Members*

Referring to FIG. 1, the embossing unit 100 includes a spring-biased movable embossing member 101 and a pair of fixed embossing members 102 mounted in the lower die assembly, and a fixed embossing member 103 and a pair of spring-biased movable embossing members 104 mounted in the upper punch assembly in opposed and cooperating relationship with the members 101 and 102, respectively. The several embossing members 101—104 are symmetrical about the vertical centerline of the embossing unit 100, as for example, illustrated in FIG. 2 by the embossing members 101 and 102.

The embossing unit 200 is similar to the embossing unit 100 and includes a fixed embossing member 201, a pair of fixed embossing members 202 (only one shown), and a pair of spring-biased movable embossing members 203 (only one shown) mounted in the lower die assembly, and a spring-biased movable embossing member 204 and pairs of fixed embossing members 205, 206 (only one pair shown) mounted in the upper punch assembly in opposed and cooperating relationship with the embossing members 201, 202 and 203, respectively. While only one side of the embossing unit 200 has been shown, it is to be understood that the arrangement of the members 202, 203, 205 and 206 on the other side of the unit is such that the several embossing members in the embossing unit 200, as in the case of the embossing unit 100, are symmetrical about the centerline of the unit.

The configuration of the embossing surfaces of the several embossing members 101—104 and 201—206 is illustrated in FIG. 2 by the showing of the embossing members 102, 202 and 203 in the lower die assembly.

Thus, when the work strip 60 (FIG. 7) is fed between the lower die assembly and the upper punch assembly and the upper punch assembly is moved into juxtaposition with the lower die assembly, the several embossing members cooperate to form bosses in the strip as shown at 61 and 62 (FIG. 7), respectively.

The fixed embossing members 102 of the embossing unit 100 are supported in the lower die assembly base 21 on a fixed circular plate 106 disposed in a recess 107 formed in the base. The fixed embossing members 102 extend upwardly and are received through slots 108 in a second plate 109 and slots 111 in the movable embossing member 101, respectively. The plate 109 is secured in position over the plate 106 by screws 112 (only one shown) and has recesses 113 formed around the periphery of each of the slots 108 adjacent the lower ends of the slots for receiving flanges 114 on the lower ends of the fixed embossing members 102, whereby the embossing members 102 are held fixed in position. The movable embossing member 101 (lower die assembly) of the embossing unit 100 is secured to the plate 109 by a plurality of screws 116 having heads 116a disposed in recesses 117 formed in the movable embossing member 101, as shown in FIG. 1, to allow limited vertical movement of the embossing member 101 relative to the plate 109 and the fixed embossing members 102.

The fixed embossing member 103 of the embossing unit 100 is secured to the upper punch assembly base 41 by a plurality of screws 118 and is provided with slots 119 which receive the movable embossing members 104. Associated ones of the fixed embossing members 102 (lower die assembly) and the movable embossing members 104 cooperate with each other and the movable embossing member 101 (lower die assembly) and the fixed embossing member 103 to deform the work strip 60 into the lower ends of the slots 119 to form the bosses 61 when the punch assembly and the die assembly are brought into juxtaposition as shown in FIG. 1. Each of the movable embossing members 104 is provided with a flange 121 at its upper end disposed in a recess 122 formed in the upper punch assembly base 41, as shown in FIG. 1, whereby the flange has limited freedom of vertical movement within the recess.

Referring next to the embossing unit 200, as noted hereinabove, only one side of this embossing unit has been shown in the drawings, the embossing member structure being duplicated on the other side of the unit such that the several embossing members 201—206 are symmetrical about the unit's vertical centerline.

Referring to FIG. 1 and the lower die assembly, the fixed embossing members 202 (only one shown) of the embossing unit 200 rest directly on the lower die assembly base 21 in a recess 207 formed in the base. The fixed embossing members 202 extend upwardly and are encircled by a plate 208 and one of the movable embossing members 203 (only one shown), the movable embossing members 203 being in turn encircled by the fixed embossing member 201. The plate 208 encircles the fixed embossing members 202 by means of slots 209 (only one shown) formed in the plate, each of the slots receiving a respective fixed embossing member 202. As shown in FIG. 1, the plate 208 further has lower and upper recesses 211 and 212 formed around the periphery of each slot 209 at the lower and upper ends of the slot, respectively. Each lower recess 211 receives a flange 213 on the lower end of the fixed embossing member 202, whereby the embossing member 202 is fixed in position on the lower die assembly base 21. Similarly, each upper recess 212 receives a flange 214 on the lower end of an associated one of the movable embossing members 203 (only one shown), the flange 214 having limited freedom of vertical movement within the recess 212 and the movable embossing member 203 having similar limited movement in a slot 216 formed in the fixed embossing member 201. The fixed embossing member 201 and the plate 208 are secured in position to the lower die assembly base 21 by screws 217.

Referring to the upper punch assembly in FIG. 1, each of the fixed embossing members 205 (only one shown) of the embossing unit 200 is secured by a screw 221 to a plate 222 disposed in a recess 223 formed in the upper punch assembly base 41, and is received through a slot 224 in one of the fixed embossing members 206 (only one shown). Each fixed embossing member 206 is, in turn, received through a slot 226 in a second plate 227 and has a flange 228 on its upper end in a recess 229 in the plate 227, whereby the embossing member 206 is fixed in position. The plates 222 and 227 are secured to the upper punch assembly base 41 by screws 231 (only one shown). The movable embossing member 204 is secured to the plate 227 by screws 232 with the heads 232a of the screws disposed in recesses 233 formed in the movable embossing member 204, as shown, such that the movable embossing member 204 has limited vertical movement relative to the fixed embossing members 205, 206 and the plate 227. Further, the movable embossing member 204 is recessed as at 204a to form a continuation of the slot 26 formed by the members 24 and 43 between the embossing units 100 and 200.

*Embossing Member Spring-Biasing Mechanism*

Each of the movable embossing members 101, 104, 203 and 204 is biased toward a cooperating fixed embossing member in the other base by respective resilient units 70, and is free to move into a plane common with the adjacent fixed embossing members in the same base when the upper punch assembly is spaced away from the lower die assembly, whereby the embossed portion of the blank 60 will be readily stripped from the various embossing members. Since each of the resilient units 70 is identical, only one will be described.

Referring to FIGS. 1 and 5, the upper punch assembly base 41 is formed with a pair of concentric lower and upper circular recesses 51 and 52, respectively, the upper recess 52 being of a larger diameter than the lower recess 51. A circular spring-carrying stop member 71 is mounted in the lower recess 51 and has a plurality of apertures 72 formed therein each of which is reduced in size at its lower end to form a shoulder 73. A plurality of members 74 provided with flanges 76 are disposed, one in each of the apertures 72, with the flange 76 adapted to engage the shoulder 73, the flange being urged toward engagement with the shoulder by a spring 77 disposed in the aperture 72 between the flange and a circular cover plate 78. The cover plate 78 is secured to the upper punch assembly base 41 in the upper recess 52 by screws 81.

*Embossing Member Positioning Mechanism*

The several members 74 in each of the resilient units 70 bear against one of a plurality of rotatable backing plates (axial cams) 82 in respective recesses 83 formed in the bases 21 and 41, as shown in FIG. 1. The backing plates are movable vertically in the recesses 83 into abutting relation with the circular spring-carrying stop members 71 when the punch and die assemblies are moved into juxtaposition with one another, whereby the various embossing members perform an embossing operation. Each of the backing plates 82 has a plurality of recesses 84 formed therein and each of the recesses 84 is beveled around its periphery at an angle of approximately 45°, as shown, for a purpose to be subsequently described.

As shown in FIG. 1, each of the recesses 84 receives the end of a movable embossing member backing pin 86, the backing pins 86 extending from the backing plates 82 to an associated one of the moveable embossing members 101, 104, 203 or 204 through apertures in the intermediate supports and/or plates. As shown in the drawing, the number, arrangement and size of the backing pins 86 (FIGS. 3, 5 and 6) varies according to the configuration and size of the movable embossing member with which they are associated.

Means are provided for rotating the backing plates 82 whereby the backing pins 86 associated therewith will come into engagement with the beveled recess portions and readily move out of the recesses 84 onto surfaces 87 of the backing plates as shown in FIGS. 3 and 6. In this respect, each of the rotatable backing plates 82 is provided with a lug 88 (FIGS. 2, 3, 5 and 6) projecting into a recess 91 in a backing plate actuating rod 92 slidably disposed in a respective base 21 or 41, whereby reciprocating movement of an actuating rod 92 will impart rotatable movement to the backing plate associated therewith.

The actuating rods 92 in the lower die assembly base 21, and the actuating rods 92 in the upper punch assembly base 41, respectively, are connected together in pairs by members 93 welded thereto, as shown in FIGS. 2, 3 and 4. A rotatable lever 94 is journaled in each of the bases 21 and 41 adjacent one of the interconnecting members 93 by means of a projecting shaft 96 integral with the lever, and is designed to be secured in one of two selective positions (see FIGS. 2, 3 and 4) by a screw 97 threaded into the associated base. The shaft 96 has a cam pin 98 eccentrically mounted thereon and disposed in a slot 99 in the adjacent interconnecting member 93. When the levers 94 are rotated the cam pins 98 will operate in the slots 99 to move the interconnecting members 93 and the backing plate actuating rods 92 inwardly to rotate the backing plates 82.

As shown in FIG. 4, the lower rotatable lever 94 in the lower die assembly is of a greater length than the upper rotatable lever 94 in the upper punch assembly, whereby, as noted hereinabove, the upper surface of one end of the lower lever serves as an abutment for either one or the other of the stop blocks 42, depending on in which of its selective locations the lower lever is located.

*Operation*

In operation, a work strip 60 is fed between the lower die assembly and the upper punch assembly to the embossing unit 100 through the guide slot 23 in a conventional manner (not shown), as for example, by a roll feed, the strip 60 having had apertures 63 formed therein in a prior operation by a punch (not shown) mounted in the apparatus. The apertures 63 cooperate with the aligning pins 44 in the member 43 and the aligning pins (not shown) in the embossing units 100 and 200 to insure that the strip 60 will be properly positioned in the embossing units 100 and 200 during an embossing operation.

As the strip 60 moves through the apparatus, portions of the strip which have been embossed by the embossing unit 100 to form the bosses 61 (FIG. 7), will move into the embossing unit 200 and the slot 26, and unembossed portions of the strip will move into the embossing unit 100, respectively. When the upper punch assembly base 41 is moved downwardly into juxtaposition with the lower die assembly base 21, the various aligning pins engage through the apertures 63 in the blank 60, whereby the previously embossed portion of the blank in the unit 200 is centered therein with the bosses 61 in alignment with the fixed embossing members 202 and 205, and the embossing members 201—206 cooperate to form the bosses 62 around the bosses 61, while the members 101—104 in the embossing unit 100 form a new set of bosses 61 in the unembossed portion of the blank. The movement of the movable embossing members 101, 104, 203 and 204 is limited by the rotatable backing plates 82 abutting against the circular spring-carrying stop members 71, and so as not to produce an excessive load on the various parts of the embossing units 100 and 200, the movement of the upper punch assembly is limited by one or the other of the stop blocks 42 (FIG. 4). As the work strip 60 continues on through the punch and die apparatus, it is intended that it ultimately be cut by suitable blanking tools (not shown) along the lines 64 to form the finished spacers.

When it is desired to reduce the depth of emboss of the work strip 60, the various parts of the embossing apparatus being positioned as shown in FIGS. 1, 2 and 5, the pairs of backing plate actuating rods 92 may be adjusted by rotating the rotatable levers 94 to a position as shown in FIG. 3, whereupon the backing plates 82 are rotated and the backing pins 86 engage the beveled portions of the recesses 84 and move out of the recesses onto the backing plate surfaces 87. This movement of the backing pins 86 changes the operating position of the embossing surfaces of the movable embossing members 101, 104, 203 and 204 relative to the adjacent embossing surfaces of the fixed embossing members 102, 103, 201, 202, 205 and 206, whereby the depth of emboss will be reduced as illustrated in FIGS. 8 and 9 by the bosses 61, 61a, and 62, 62a. Conversely, when the parts are positioned as shown in FIGS. 3 and 6 and it is desired to increase the depth of emboss by the embossing members, the levers 94 may be rotated to the position as shown in FIG. 2 and the operating position of the embossing surfaces of the movable embossing members 101, 104, 203 and 204 will be changed in the opposite direction.

While the movable embossing member positioning mechanism of the instant invention has been shown in combination with an embossing punch and die apparatus for forming spacers, wherein the spacers are formed two at a time by adjacent embossing units including spring-biased embossing members, it is contemplated that this mechanism may also be utilized in punch and die apparatus comprising a single embossing unit having a rigidly backed embossing member or members, or in other embossing devices for manufacturing other types of piece parts.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. Apparatus for embossing articles to a variable preselected depth which comprises, a support, first embossing means fixedly mounted in said support, second embossing means movably mounted in said support, said first and second embossing means having adjacent cooperating embossing surfaces movable with respect to one another and designed to engage a work part on the same side thereof in an embossing operation, resilient means in said support biasing said second embossing means toward a work part engaging position, movable means in said support between said resilient means and said second embossing means, said movable means being movable with said second embossing means against the action of said resilient means in an embossing operation, means in said support for limiting said movement of said movable means and said second embossing means, and control means drivingly engaged with said movable means throughout the movement of said movable means with said second embossing means, said control means being movable within said support to move said movable means independently of said movement with said second embossing means to move said second embossing means relative to said limiting means, to vary the operating positions of the embossing surfaces relative to one another, and thereby vary the depth of emboss of the articles when said embossing surfaces are brought into engagement therewith.

2. Apparatus for embossing articles to a variable preselected depth which comprises, a pair of opposed supports movable into juxtaposition with one another, first embossing means fixedly mounted in each of said supports, second embossing means movably mounted in each of said supports opposite the first embossing means in the other support, said first and second embossing means in each support having adjacent cooperating embossing surfaces movable with respect to one another and designed to engage a work part on the same side thereof, and means in said supports for moving said movable embossing means, to vary the operating positions of the adjacent embossing surfaces in the respective supports relative to one another, and thereby vary the depth of emboss of the articles when said supports are brought into juxtaposition with one another.

3. Apparatus for embossing articles to a variable preselected depth which comprises, a pair of opposed supports movable into juxtaposition with one another, first embossing means fixedly mounted in each of said supports, second embossing means movably mounted in each of said supports opposite the first embossing means in the other support, said first and said second embossing means in each support having adjacent cooperating embossing surfaces movable with respect to one another and designed to engage a work part on the same side thereof, said second embossing means in each support being movable during an embossing operation from a normal position toward an embossing position wherein the embossing surface thereof is recessed with respect to the adjacent embossing surface of the associated first embossing means, resilient means in said supports biasing said second embossing means toward said normal positions, and stop means in said supports for limiting the movement of said second embossing means away from said normal positions, said stop means being adjustable for adjusting the limit of movement of said second embossing means away from said normal positions to vary the depth of emboss of the articles when said supports are brought into juxtaposition with one another.

4. Apparatus for embossing articles to a variable preselected depth which comprises, a pair of opposed supports movable into juxtaposition with one another, first embossing means fixedly mounted in each of said supports, second embossing means movably mounted in each of said supports opposite the first embossing means in the other support, said first and second embossing means in each support having adjacent cooperating embossing surfaces movable with respect to one another and designed to engage a work part on the same side thereof, resilient means in said supports biasing said second embossing means in directions generally toward each other, movable means in said supports between said resilient means and said second embossing means, said movable means being movable with said second embossing means against the action of said resilient means in an embossing operation, means in said supports for limiting said movement of said movable means and said second embossing means, said movable means also being movable independently of said movement with said second embossing means to move said second embossing means relative to said limiting means, to vary the operating positions of the adjacent embossing surfaces in the respective supports relative to one another and thereby vary the depth of emboss of the articles when said supports are brought into juxtaposition with one another.

5. Apparatus for embossing articles to a variable preselected depth which comprises, a pair of opposed supports movable into juxtaposition with one another, first embossing means fixedly mounted in each of said supports, second embossing means movably mounted in each of said supports opposite the first embossing means in the other support, said first and second embossing means in each support having adjacent cooperating embossing surfaces movable with respect to one another and designed to engage a work part on the same side thereof, resilient means in said supports biasing said second embossing means in directions generally toward each other, movable means in said supports having surface portions designed to engage said resilient means and said second embossing means, said movable means being movable with said second embossing means against the action of said resilient means in an embossing operation, means in said supports for limiting the movement of said movable means with said second embossing means, means in said supports for selectively varying the spacing between the surface portions of said movable means which are in engagement with said resilient means and the surface portions of said movable means which are in engagement with said second embossing means, to vary the operating positions of the adjacent embossing surfaces in the respective supports relative to one another, and thereby vary the depth of emboss of the articles when said supports are brought into juxtaposition with one another.

6. Apparatus for embossing articles to a variable preselected depth which comprises, a pair of opposed supports movable into juxtaposition with one another, first embossing means fixedly mounted in each of said supports, second embossing means movably mounted in each of said supports opposite the first embossing means in the other support, said first and second embossing means in each support having adjacent cooperating embossing surfaces movable with respect to one another and designed to engage a work part on the same side thereof, movable cams between said second embossing means and a portion of a respective support, and means for moving said cams to vary the operating positions of the adjacent embossing surfaces in the respective supports relative to one another, and thereby vary the depth of emboss of the articles when said supports are brought into juxtaposition with one another.

7. Apparatus for embossing articles to a variable preselected depth which comprises, a pair of opposed supports movable into juxtaposition with one another, first embossing means fixedly mounted in each of said supports, second embossing means movably mounted in each of said supports opposite the first embossing means in the other support, said first and second embossing means in each support having adjacent cooperating embossing surfaces movable with respect to one another and designed to engage a work part on the same side thereof, resilient means in said supports biasing said second embossing means in directions generally toward each other, cam means in said supports between and in engagement with said resilient means and said second embossing means, said cam means being movable in both a path parallel to, and along a path which intersects, the direction of movement of said second embossing means, means in said supports for limiting the movement of said cam means parallel to the direction of movement of said second embossing means in an embossing operation, and means in said supports for moving said cam means along its path which intersects the direction of movement of said second embossing means, to vary the operating positions of the adjacent embossing surfaces in the respective supports relative to one another, and thereby vary the depth of emboss of the articles when said supports are brought into juxtaposition with one another.

8. Apparatus for embossing articles to a variable preselected depth which comprises, a pair of opposed supports movable into juxtaposition with one another, first embossing means fixedly mounted in each of said supports, second embossing means movably mounted in each of said supports opposite the first embossing means in the other support, said first and second embossing means in each support having adjacent cooperating embossing surfaces movable with respect to one another and designed to engage a work part on the same side thereof, rotatable axial cams between said second movable embossing means and a portion of a respective support, and means for moving said axial cams, to vary the operating positions of the adjacent embossing surfaces in the respective supports relative to one another, and thereby vary the depth of emboss of the articles when said supports are brought into juxtaposition with one another.

9. Apparatus for embossing articles to a variable preselected depth which comprises, a pair of opposed supports movable into juxtaposition with one another, first embossing means fixedly mounted in each of said supports, second embossing means movably mounted in each of said supports opposite the first embossing means in the other support, said first and second embossing means in each support having adjacent cooperating embossing surfaces movable with respect to one another and designed to engage a work part on the same side thereof, resilient means in said supports biasing said second embossing means in directions generally toward each other, rotatable axial cams mounted in said supports between said resilient means and said second embossing means, said axial cams being movable with said second embossing means against the action of said resilient means in an embossing operation, means in said supports for limiting the last-mentioned movement of said axial cams, and means for rotating said axial cams, to vary the operating positions of the adjacent embossing surfaces in the respective supports relative to one another, and thereby vary the depth of emboss of the articles when said supports are brought into juxtaposition with one another.

10. Apparatus for embossing articles to a variable preselected depth which comprises, a support, first embossing means fixedly mounted in said support, second embossing means movably mounted in said support, said first and said second embossing means having adjacent cooperating embossing surfaces movable with respect to one another into and out of a common plane and designed to engage a work part on the same side thereof, resilient means in said support biasing said second embossing means toward a work part engaging position, a rotatable generally disk-like axial cam mounted in said support between said resilient means and said second embossing means, said axial cam being axially movable with said second embossing means against the action of said resilient means in an embossing operation, means in said support for limiting the last-mentioned movement of said axial cam, and a control member drivingly engaged with the periphery of said axial cam throughout the axial movement of said axial cam, said control member being slidable within said support to rotate said axial cam to vary the operating positions of the adjacent embossing surfaces relative to one another and thereby vary the depth of emboss of the articles when said embossing surfaces are brought into engagement therewith.

11. Apparatus for embossing articles to a variable preselected depth which comprises, a support, first embossing means fixedly mounted in said support, second embossing means movably mounted in said support, said first and said second embossing means having adjacent cooperating embossing surfaces movable with respect to one another into and out of a common plane and designed to engage a work part on the same side thereof, resilient means in said support biasing said second embossing means toward a work part engaging position, a rotatable generally disk-like axial cam mounted in said support between said resilient means and said second embossing means, said axial cam being axially movable with said second embossing means against the action of said resilient means in an embossing operation, means in said support for limiting the last-mentioned movement of said axial cam, a lug on the periphery of said axial cam, and a control member drivingly engaged with said lug throughout the axial movement of said axial cam against said limiting means in an embossing operation, said control member being slidable within said support to rotate said axial cam to vary the operating positions of the adjacent embossing surfaces relative to one another and thereby vary the depth of emboss of the articles when said embossing surfaces are brought into engagement therewith.

12. Apparatus for embossing articles to a variable preselected depth which comprises, a pair of opposed supports movable into juxtaposition with one another, first embossing means fixedly mounted in each of said supports, second embossing means movably mounted in each of said supports opposite the first embossing means in the other support, said first and second embossing means in each support having adjacent cooperating embossing surfaces movable with respect to one another and designed to engage a work part on the same side thereof, resilient means in said supports biasing said second embossing means in directions generally toward each other, rotatable axial cams mounted in said supports between said resilient means and said second embossing means, said axial cams being movable with said second embossing means against the action of said resilient means in an embossing operation, means in said supports for limiting the last-mentioned movement of said axial cams, and means for rotating said axial cams, to vary the operating positions of the adjacent embossing surfaces in the respective supports relative to one another, and thereby vary the depth of emboss of the articles when said supports are brought into juxtaposition with one another, said last-mentioned means including longitudinally movable members mounted in said supports and engageable with said rotatable axial cams, rotatable members journaled in said supports, and a cam surface on each of said rotatable members offset from the axis of rotation thereof and engageable with one of said longitudinally movable members.

13. Apparatus for forming a plurality of bosses in articles to the same variable preselected depth which comprises, a pair of opposed supports movable into juxtaposition with one another, a plurality of embossing units mounted in said supports, said embossing units including first embossing means fixedly mounted in each of said supports and second embossing means movably mounted in each of said supports opposite the first embossing means in the other support, the adjacent first and second embossing means in each support having adjacent cooperating embossing surfaces movable with respect to one another and designed to engage a work part on the same side thereof, resilient means biasing the second embossing means in each of said embossing units in directions generally toward each other, rotatable axial cams mounted in said supports between said resilient means and said second embossing means, said axial cams being movable with said second embossing means against the action of said resilient means in an embossing operation, means in said supports for limiting said last-mentioned movement of said axial cams, and means for rotating said axial cams to vary the operating positions of the adjacent embossing surfaces in the respective supports relative to one another, and thereby vary the depth of emboss of the articles when said supports are brought into juxtaposition with one another, said means for rotating said axial cams including rods movably mounted in said supports and engageable with said axial cams, first members connecting those rods mounted in a common support together, said first members having slots formed therein, second members journaled in said supports, and a cam surface on each of said second members offset from the center of rotation of said second member and engageable in a respective first member slot whereby rotation of said second members actuates said rods to rotate said axial cams.

14. Apparatus for forming a plurality of bosses to the same variable preselected depth in articles which comprises, a pair of opposed supports movable into juxtaposition with one another, a plurality of embossing units mounted in said supports, said embossing units each including first embossing means fixedly mounted in each of said supports and second embossing means movably mounted in each of said supports opposite the first embossing means in the other support, the adjacent first and second embossing means in each support having adjacent cooperating embossing surfaces movable with respect to one another and designed to engage a work part on the same side thereof, resilient means biasing said second embossing means in each of said units in directions generally toward each other, said second embossing means each including a plurality of pins, rotatable axial camming plates positioned between and in engagement with said pins and said resilient means, said camming plates being movable with said second embossing means against the action of said resilient means in an embossing operation, means in said supports for limiting said last-mentioned movement of said axial camming plates, means for rotating said camming plates, to vary the operating positions of the adjacent embossing surfaces in the respective supports relative to one another, and thereby vary the depth of emboss of the articles when said supports are brought into juxtaposition with one another, and a lug projecting from each of said camming plates, said means for rotating said camming plates including rods slidably mounted in each of said supports and engageable with said lugs, first members connecting those rods mounted in a common support together, said first members having slots formed therein, second members journaled in said supports, and a cam surface on each of said second members offset from the center of rotation thereof and engageable in a respective first member slot whereby rotation of said second members actuates said rods to rotate said camming plates.

15. In combination with apparatus for forming a plurality of bosses in articles to the same variable preselected depth including a plurality of laterally spaced embossing units mounted in a support, the improvement comprising, a fixed embossing means in each of the units, a movable embossing means in each of the units, the fixed and movable embossing means in each unit having adjacent cooperating surfaces movable with respect to one another and designed to engage a work part on the same side thereof, rotatable camming plates mounted in the support in engagement with said movable embossing means, means for rotating said camming plates to vary the operating positions of the embossing surfaces in the respective units relative to one another and thereby vary the depth of emboss of the articles when the several embossing means are operated, said means for rotating said camming plates including a pair of movable members each engageable with a portion of a respective camming plate, a member interconnecting said movable members, a rotatable member, and a cam surface on said rotatable member offset from the axle of rotation thereof and engaging said interconnecting member whereby upon rotation of said rotatable member said cam surface moves said interconnecting member to actuate said movable members and rotate said camming plates.

16. In combination with apparatus for forming a plurality of bosses in articles to the same variable preselected depth including a plurality of laterally spaced embossing units mounted in a support, the improvement comprising, a fixed embossing means in each of the units, a movable embossing means in each of the units, the fixed and movable embossing means in each unit having adjacent cooperating surfaces movable with respect to one another and designed to engage a work part on the same side thereof, rotatable axial camming plates mounted in the support in engagement with said movable embossing means, means for rotating said camming plates to vary the operating positions of the embossing surfaces in the respective units relative to one another, and thereby vary the depth of emboss of the articles when the several embossing means are operated, a projecting lug formed on each of said rotatable camming plates, said means for rotating said camming plates including a pair of slidably mounted rods each engageable with one of said lugs, a member interconnecting said rods adjacent corresponding ends thereof, said member having a slot formed therein, a rotatable member, and a cam surface on said rotatable member offset from the axis of rotation thereof and positioned in the slot of said interconnecting member, whereby upon rotation of said rotatable member said cam surface moves in said slot to move said interconnecting member to actuate said rods and rotate said camming plates.

References Cited in the file of this patent

UNITED STATES PATENTS

| | | |
|---|---|---|
| 771,669 | Schneegass | Oct. 4, 1904 |
| 1,968,133 | Engel | July 31, 1934 |
| 2,077,128 | Pannier | Apr. 13, 1937 |
| 2,244,613 | Freeman | June 3, 1941 |
| 2,278,542 | Freeman | Apr. 7, 1942 |
| 2,364,835 | Whistler et al. | Dec. 12, 1944 |
| 2,591,935 | Heigl | Apr. 8, 1952 |